United States Patent
Pan et al.

(10) Patent No.: US 7,058,626 B1
(45) Date of Patent: Jun. 6, 2006

(54) METHOD AND SYSTEM FOR PROVIDING NATIVE LANGUAGE QUERY SERVICE

(75) Inventors: Yue Pan, Beijing (CN); Li Ping Yang, Beijing (CN); Lindon Robertson, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 09/627,372

(22) Filed: Jul. 28, 2000

(30) Foreign Application Priority Data

Jul. 28, 1999 (CN) .............................. 99 1 10540

(51) Int. Cl.
*G06F 17/30* (2006.01)

(52) U.S. Cl. ............... 707/4; 707/5; 707/6; 707/10; 704/9

(58) Field of Classification Search ............. 707/1–10, 707/102, 202, 205, 203, 536, 104.1; 715/501.5, 715/501.1, 536, 501; 704/4, 8–10, 206; 709/203, 709/231

See application file for complete search history.

(56) References Cited

U.S. PATENT DOCUMENTS

| | | | | |
|---|---|---|---|---|
| 5,426,583 A | * | 6/1995 | Uribe-Echebarria Diaz De Mendibil | 704/2 |
| 5,802,526 A | * | 9/1998 | Fawcett et al. | 707/104.1 |
| 5,819,264 A | * | 10/1998 | Palmon et al. | 707/4 |
| 5,842,206 A | * | 11/1998 | Sotomayor | 707/5 |
| 6,006,221 A | * | 12/1999 | Liddy et al. | 707/5 |
| 6,009,422 A | * | 12/1999 | Ciccarelli | 707/4 |
| 6,038,561 A | * | 3/2000 | Snyder et al. | 707/6 |
| 6,061,738 A | * | 5/2000 | Osaku et al. | 709/245 |
| 6,064,951 A | * | 5/2000 | Park et al. | 704/8 |
| 6,078,914 A | * | 6/2000 | Redfern | 707/3 |
| 6,088,796 A | * | 7/2000 | Cianfrocca et al. | 707/10 |
| 6,167,369 A | * | 12/2000 | Schulze | 704/9 |
| 6,167,393 A | * | 12/2000 | Davis et al. | 707/3 |
| 6,178,427 B1 | * | 1/2001 | Parker | 707/202 |
| 6,202,062 B1 | * | 3/2001 | Cameron et al. | 707/3 |
| 6,233,544 B1 | * | 5/2001 | Alshawi | 704/2 |
| 6,289,357 B1 | * | 9/2001 | Parker | |
| 6,314,469 B1 | * | 11/2001 | Tan et al. | 709/245 |
| 6,327,590 B1 | * | 12/2001 | Chidlovskii et al. | 707/5 |
| 6,349,276 B1 | * | 2/2002 | McCarley | 704/8 |

(Continued)

FOREIGN PATENT DOCUMENTS

EP    1 072 984 A2 *  7/2000

(Continued)

OTHER PUBLICATIONS

"Distributed Chinese Bibliographic searching"—A Singaporean Project delivers Multilingual Support-Apr. 1998, 41, Nol. 4, Communications of the ACM; pp.:66-68.*

(Continued)

*Primary Examiner*—Debbie M. Le
(74) *Attorney, Agent, or Firm*—Ference & Associates

(57) ABSTRACT

The present invention provides a method and system for providing native language query service for Internet users by using a plurality of search engines. The method of the present invention includes the steps of: (a) receiving at a site an original query request from one user; (b) selecting a suitable search engine; (c) translating said query words of native language into query words of dedicated language of said selected search engine; (d) constructing a new query request directing to said search engine; (e) sending said new query request and receiving a returned query result; (f) sending said query result back to said user as a query result in relation to said original query request.

15 Claims, 9 Drawing Sheets

U.S. PATENT DOCUMENTS

| | | | | |
|---|---|---|---|---|
| 6,356,894 B1 * | 3/2002 | Nosohara | .................. | 707/3 |
| 6,360,196 B1 * | 3/2002 | Poznanski et al. | ............. | 704/8 |
| 6,381,598 B1 * | 4/2002 | Williamowski et al. | ........ | 707/5 |
| 6,424,983 B1 * | 7/2002 | Schabes et al. | ................ | 707/5 |
| 6,434,614 B1 * | 8/2002 | Blumenau | .................. | 709/224 |
| 6,466,901 B1 * | 10/2002 | Loofbourrow et al. | ......... | 704/9 |
| 6,505,212 B1 * | 1/2003 | Nakano et al. | ............. | 707/200 |
| 6,526,426 B1 * | 2/2003 | Lakritz | ........................... | 704/8 |
| 6,598,039 B1 * | 7/2003 | Livowsky | ...................... | 707/3 |
| 6,604,101 B1 * | 8/2003 | Chan et al. | .................... | 704/2 |
| 6,738,827 B1 * | 5/2004 | Abir | .......................... | 709/245 |
| 2001/0021934 A1 * | 9/2001 | Yokoi | ......................... | 707/500 |
| 2004/0194018 A1 * | 9/2004 | Abir | ........................ | 715/501.1 |

FOREIGN PATENT DOCUMENTS

| | | | |
|---|---|---|---|
| EP | | 1 072 984 A2 * | 5/2001 |
| JP | PUPA 10-187752 | | 7/1998 |
| JP | PUPA 10-334115 | | 12/1998 |
| WO | WO 98/26357 | | 6/1998 |

OTHER PUBLICATIONS

"Query Term Disambiguation for web Cross-Language Information retrieval Using a Search Engine"—Akira maeda, Fatiha Sadat, Masatoshi Yoshikawa and Shunsuke Uemura- ACM Jun.-2000 (pp.: 25-32).*

"ECIRS: An English-Chinses Cross-Language Information-Retrival System"—Su Liu IEEE- vol. 2; Feb.-2001 (pp.: 954-959).*

"Effects of Term Segmentation on Chinese/English Cross-Language Information retrieval"—Douglas W. Oard and Jianqiang Wang; IEEE- 1999, (pp.: 149-157).*

"The Ultimate Search Engine Link Page" from PHP-Nuke, International Search Engine Directory.*

"Google Language Tool"—Search Specific Language or Countries.*

SIG Notes vol. 9, No. 82, (ISSN 0919-6072) 98-NL-127, pp. 63-70, Information Society of Japan.

Powell J. et al., "Multilingual Federated Searching Across Heterogeneous Colliections", D-LIB Magazine, ISSN 1082-9873, Sep. 1998, XP002255043, Virginia, USA.

Cross V et al., "Fuzzy Ontologies for Multilingual Document Exploitation", North American Fuzzy INformation, 1999., 18th International Conference ofthe NAFIPS, N.Y., N.Y., USA, IEEE, US. Jun. 10, 1999, pp. 392-397, XP010343038, ISBN 0-7803-5211-4.

Croft W B et al., "Applications of Multilingual Text Retrieval", System Sciences, 1996, Proceedings of the Twenty-Ninth Hawaii International Conference on System Sciences, Wailea, HI, USA, IEEE Comput. Soc. US, vol. 5, Jan. 3, 1996, pp 98-107, Xp010156872, ISBN.

* cited by examiner

METHOD AND SYSTEM FOR PROVIDING NATIVE LANGUAGE QUERY SERVICE

FIELD OF THE INVENTION

The present invention relates to a method and system of information retrieval, especially to a method and system for providing query service for Internet or database users, and particularly to a method and system for providing query service in native language for Internet or database users.

BACKGROUND OF THE INVENTION

With the development of computerized information source such as remote networks, users of data processing system are able to connect to other servers and networks so as to retrieve massive electronic information which can not be accessed in traditional electronic media. This kind of information media is increasingly substituting traditional one for information distribution such as newspaper and even television.

In communication, different computer networks are connected with each other through "gateway" which handles the data transmission and message transformation from sending network to receiving network. Gateway is a device used to connect different networks (that use different communication protocols) so that information can be transmitted from one network to another. Gateway also transforms the format of information so that it is compatible with the protocol adopted by the other network.

Internet is one of the remote networks generally used today. Internet originates from ARPAnet of the United States and now is the largest open computer network consisting of numerous networks connected with each other. Internet uses TCP/IP protocol that is the abbreviation for "Transport Control Protocol/Internet Protocol". The software protocol was developed by Defense Department of the United States for communication between computers. Internet can be described as the distributed computer network consisting of computers that connect with each other and run network protocols that enable users to share network information. Because of the requirement to share information in general use, remote networks such as Internet are developed into "open" network. For open system, developers can design software application for specification operation or service almost without any restriction. For details about node, object and link of Internet, readers can refer to textbook "Mastering the Internet" by G. H. Cady et al. and published by Sybex Company, Alameda, Calif., USA.

The electronic information exchanged among computers is usually formatted in hypertext. Hypertext is a prior technology that couples text, image, audio and action into a complex, nonlinear network and permit users to "browse" or "surf" by relevant title. The term "hypertext" is created in 1960s to refer to the computer files which show distinct nonlinear structure from linear structure in book, film and language.

On the other hand, the term "hypermedia" emerging recently is a synonym of "hypertext" but emphasizing on the non-text constituents of hypertext such as, animation, audio, video and etc. Hypermedia image, audio, video or their arbitrary combination can be synthesized into information storage and retrieval system. The hypermedia and hypertext, especially the interactive ones selectable and controllable by the users, are constructed in an environment, where the work and study are parallel to human thoughts. That is, they permit the users to establish correlation between the topics instead of moving sequentially from one motion to the next one. The hypermedia and hypertext are linked in such a way that the users can jump from one topic to another relevant one during search period. Hyper links are embedded in hypermedia or hypertext files and lead to other hypermedia or hypertext files when "clicked" by the reader.

World Wide Web (WWW), or "Web", is the multimedia information retrieval system on Internet. Web is the most common method of transferring data in network. Other methods include FTP (File Transfer Protocol) and Gopher, etc., but they are not so common as web. On web, clients access the service provided by web server using Hypertext Transfer Protocol (HTTP), where HTTP is a well-known application protocol, which permits the users to use a standard page description language called Hypertext Markup Language (HTML) to access various kinds of files (e.g. text files, graphics, images, audios, videos, etc). HTML provides underlying file formats, and allows developers to specify the links to other servers and files. Link that denotes the network path to other web server is specified in Universal Resource Locator (URL). There is dedicated syntax for specifying network path by URL.

URL is typically formatted as: http://somehost/someprogram?parameters . . . in which "somehost" is the host address of the URL, "somedirectory" is the directory name where the web page indicated by the URL can be found. The usual way to decompose an URL into an actual address of a Web server is by using a domain server. In the internet or intranet, a domain name server converts the host name into an actual Web address. One example of the domain name servers is the Domain Name Service (DNS) in Internet. The procedure, in which a Web user requests a host name and an address from the domain name server, is called parsing. In the TCP/IP, the domain name server parses the host name and makes one or more IP address lists, which are returned to the Web clients, who requested on the HTTP. Each IP address specifies a server, which is used to process the request contents sent by the browser.

WWW which employs hypertext protocol follows a client/server architecture. At the client side is the browser software that sends requests to web server and then explains, displays or plays the hypertext information and other multimedia files returned by a web server.

While thousands upon thousands of companies, universities, government offices, museums and municipal authorities publish their homepages on the web, Internet grows to be a very valuable information source. Even a beginner is able to browse thousands of web pages or news groups after a little practice. Hence the Internet accesses and the corresponding markets are growing rapidly.

Today World Wide Web holds huge amount of information which is organized by hypertext pages. The number of pages is so large that it is impossible for people to follow site by site, link by link even within one site like IBM's, let alone the whole web. Thus it is very important for users to efficiently, rapidly and conveniently find the interested information on world wide web.

Currently, there are many kinds of information retrieval facilities. One of them is a directory service. In a directory service, web sites/pages are classified into categories and each category is further classified into sub-categories. Further more, categories are organized hierarchically and presented as web pages with links to sub-categories. By exploring layer by layer, finally the users may discover a set of relevant web sites/pages eventually. With the amount of web sites/pages increasing explosively, directories grow to huge sizes. For example, Yahoo! currently has 25,000 categories that hold over half a million sites.

Another kind of information retrieval facility is a search engine. A search engine indexes web sites/pages by using key words. A user inputs query words, that are key words acceptable by the search engine, and then he gets related web sites/pages. More and more people would rather query search engines for web sites/pages by using key words than exploring layer by layer in the directories. Category entries may also be indexed for searching. For example, in Yahoo! both category entries and web sites are presented as search results.

Computer application software such as free-of-charge or low cost Internet search engines let people easily get to the Web sites by querying so as to obtain corresponding topic information from those sites. When users are surfing on the Internet, directories and search engines help them so much that they are recognized as "portal sites" to the Internet. Famous directories/search engines include Yahoo!, AltaVista, Exite, etc. Sina (www.sina.com.cn) is a very famous Chinese portal site. However, most of web pages are written in English and also cataloged/indexed in English. Users who can not read English can not enjoy the convenience.

To solve this problem, there are some web page translation software that can statically or dynamically translate web pages from one language into another, such as from English into Chinese, or from German into English, etc. Some software also reserves HTML tag structure such that users can follow links marked in their native language without difficulty. Moreover, users can also utilize the directories since the names of categories are also dynamically translated.

Even so, Internet users still can not query and retrieve in their native language different from that search engines used in indexing. The reason is that the translation of the query words from the native language into other languages that search engines are using is lacking, even if web page translation software does exist.

Some query translation prototypes/solutions partly solve the problem. They provide predefined forms to collect input from the users and then translate the user input into a language, that the search engines can accept, and construct query commands, which are later sent to particular search engines. However, they have the following drawbacks:

Firstly, many Internet search engines support a combinatorial query and/or an second query to narrow down the scope. In the first case, the word string to be matched as a search condition is logically combined with other search conditions such as categories or date of publication to be retrieved. In the second case, the second search is done by using the result returned by the first search. However, these functions are lost when users use these query translation software.

Secondly, ambiguity of translation cannot be properly handled. When query words are translated from one language into another, the mapping is often one-to-many. The problem is further complicated by the presence of synonym (a word with multiple meaning) in many languages especially in Chinese. For example, the Chinese word ÿ" (PI-NYIN: _qing1) has four meanings and each meaning may correspond to several English translations. The first meaning can be translated into English words "cavity" and "chamber". The second meaning can be translated into English word "speech". The third meaning can be translated into English words "tune" and "pitch". The fourth meaning can be translated into English words "accent" and "tone". There are many such kind of synonyms in Chinese.

The query translation server for Internet search engines which is described by this invention can eliminate the above drawbacks.

SUMMARY OF THE INVENTION

The present invention in accordance with at least one presently preferred embodiment supports a method for the Internet user to utilize query service in the native language.

The second object of this invention is to provide a kind of system for the Internet user to utilize query service in the native language.

The third object of this invention is to provide a kind of system for the database user to utilize query service in the native language.

For the implementation of said first object, this invention is a method for providing native language query service for Internet users using a plurality of existing Internet search engines, each search engine having a respective dedicated query language, adapted for receiving query request containing query terms in said dedicated language and returning query results in relation to said query terms, said method comprising the steps of:
  (a) receiving at a site an original query request from one user, in said original query request there are query terms of said user in his/her native language;
  (b) selecting a suitable search engine from said plurality of search engines;
  (c) translating said query terms in the native language into query terms in the dedicated language of said selected search engine;
  (d) constructing a new query request directing to said search engine based on said original query request and said query terms in said dedicated language;
  (e) sending said new query request to said selected search engine and receiving a returned query result;
  (f) sending said query result back to said user as a query result in relation to said original query request.

In another respect of the instant intention, there is provided a method to produce a native language query service for Internet users by using a plurality of existing Internet search engines, each search engine having a respective dedicated query language, adapted for receiving query request containing query terms in said dedicated language and returning query results in relation to said query terms, said method comprising the steps of:
  (a) receiving at a site an original query request from said Internet user, said original query request containing an URL requested by said user, said URL having a prefix for designating said site;
  (b) removing said prefix from said URL;
  (c) selecting a suitable search engine from said plurality of search engines;
  (d) if said removed prefix is a redirect prefix, performing the following steps of:
    (d1) sending a request containing said URL to said selected search engine and receiving a web page as a response;
    (d2) adding a translation prefix in front of URLs that need query terms and adding redirect prefix in front of other URLs in said web page, so as to form a new web page;
  (e) if said removed prefix is a translation prefix, performing the following steps of:

(e1) translating query terms of user_s native language in parameters of said URL into query words in said dedicated language of said selected search engine;

(e2) replacing query terms of user_s native language in parameters of said URL with query terms in said dedicated language;

(e3) adding a redirect prefix in front of said URL;

(e4) generating a new web page, embedding said URL and a script program in said web page, said script program enabling the client which receives said new web page to perform a step of automatically sending another original query request based on said URL embedded in said web page;

(f) sending said new web page back to said user as a query result in relation to said original query request.

For implementation of the aforesaid second object, this invention provides a system for providing native language query service for Internet users using a plurality of existing Internet search engines, each search engine having a respective dedicated query language, adapted for receiving query request containing query terms in said dedicated language and returning query results in relation to said query terms, wherein said system utilizes a query translation server which comprises:

a client interface, for receiving query requests sent by clients and returning query results to said clients;

a request dispatching apparatus, for receiving said query requests from said client interface, removing prefixes from requested URLs, and distributing said query requests to different components based on said removed prefixes;

a web page obtaining apparatus, for receiving a query request whose prefix is a redirect prefix from said request dispatching apparatus, sending said query request to a search engine designated by an URL and obtaining an URL requested web page;

a web page modifying apparatus, for forming a new web page by adding translation prefixes in front of URLs that need query terms and adding redirect prefixes in front of other URLs in the obtained web page, and sending said new web page to said client interface;

a query translation apparatus, for receiving a query request whose prefix is a translation prefix from said request dispatching apparatus, translating query terms in user_s native language in the requested URL into and replacing them with query terms in a dedicated language of said search engine, and adding a redirect prefix in front of said URL;

a web page generation apparatus, for generating a new web page, embedding said URL and a script program in said web page, and sending said new web page to said client interface, said script program enabling a client which receives said new web page to perform a step of automatically sending another query request based on said URL embedded in said web page.

For implementation of the aforesaid third object, this invention describes a system for providing native language query service for database users using a plurality of databases, each database having a respective dedicated query language, adapted for receiving query request containing query terms in said dedicated language and returning query results in relation to said query terms, wherein said system utilizes a query translation server which comprises:

a client interface, for receiving query requests sent by clients and returning query results to said clients;

a query translation apparatus, for receiving query terms in user_s native language in the query requests received by said client interface into and replacing them with query terms in the dedicated language of the database;

a query result obtaining apparatus, for sending the translated query requests to the databases designated by said query requests and obtaining query results.

By using the method and system of this invention, a user need only to select one of Internet search engines and use its built-in complex query functions to query in his/her native language without considering the language used by the search engine. Thus users from other countries can share the great convenience provided when they retrieve or query for information in Internet by using their native languages.

Some search engines provide built-in complex query functions including combinatorial queries, evolutionary queries, and restricted queries. With the method and system of this invention, the above functions are retained.

According to the method and system of this invention, it is also possible to do site-specific query translation and discriminate multiple meanings of a synonym and multiple translations of a meaning.

To enable the above features, it is not necessary to modify any client software such as a browser or the search engines. Thus the method and system of this invention is easy to implement and promote.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
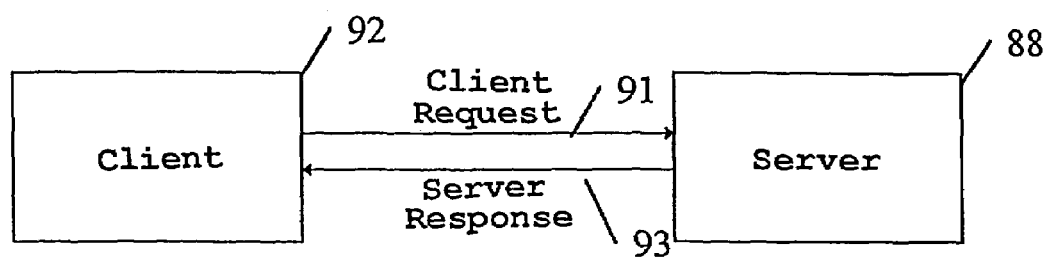
FIG. 1 is the client/server architecture that is widely applied in prior art.

FIG. 1, the client/server architecture is shown which is widely applied in the prior art. Client request (such as query request, news request) 91 is sent to server 88 by client 92. Server 88 may be a remote computer system that can be accessed through Internet or other communication networks. For example, it is possible to run client 92 on a user personal computer (not shown) while running an Internet search engine on server 88.

Per client request, server 88 scans and searches for original information (such as online news or news group), then returns the filtered electronic information to client 92 as a server's response 93.

Client 92 may run on the first computer, the server process may run on the second computer system. They communicate with each other through the communication media, thus providing distributed service and enabling multiple clients to utilize the information collection ability of one server.

On world wide web, it is usually possible to retrieve information by means of browser compatible with HTML running on client computer. When the user a of browser specifies a route by URL, client computer sends a request to domain name server so as to convert the host name in URL into IP address of the server. Domain name server responses with a list of one or multiple IP addresses. One of these IP addresses is used by the browser to establish the connection with a server. If the server is available, it returns the documents or other objects formatted according to HTML. On the server is running the corresponding server software, which provides information in the form of HTTP response to the client. HTTP response corresponds to the Web pages constructed in HTML language or data produced by other servers. Web browsers have become the main interface for accessing many networks and servers.

For example, when a user retrieves information using search engines, he/she first runs one kind of browser software on his/her personal computer and then designates and inputs an URL for a search engine, such as the URL of Yahoo! site, "[http://]www.yahoo.com". Yahoo! server returns its homepage to the browser. The homepage is formatted in HTML and the browser displays the content according to HTML specification. The user can click on the hypertext using pointing device or input query term for retrieval or query.

The above browser can be any kind of browser available on the market, such as Navigator and Communicator from Netscape, Internet Explorer from Microsoft, Mosaic and Lynx from National Center for Super Computer Application (NCSA) in Urbana-Champaign of Illinois. Any other browsers which can provide functions specified by HTTP can be used. Web browser is typically a program that is able to parse and display HTML documents, though those skilled in the art will appreciate that the future browsers will be able to handle other markup languages such as dynamic HTML and XML documents.

A typical server includes an IBM RISC/6000 computer (based on so-called Reduced Instructions Set Computer) running an AIX (Advanced Interactive Executable program version 4.1 or higher version) operating system and server program. The server accepts requests from the client through dial-up computer network in order to obtain the files or objects requested by the client or to execute the requested tasks. Various types of RISC-based computer are described in many publications of IBM Corporation, such as Hardware Technical Reference Manual of RS/6000, 7013 and 7016 POWERstation and POWERserver (order number SA23-2644-00). The AIX operating system is described in the first edition of Technical Reference Manual of AIX operating system published by IBM Corporation in November 1985 and other publications. While the above-mentioned are practical, any suitable hard ware/operating system/server combination can be employed. For example, the server architecture of WINDOWS 95/98/NT of Microsoft Corporation is available.

Figure 2:
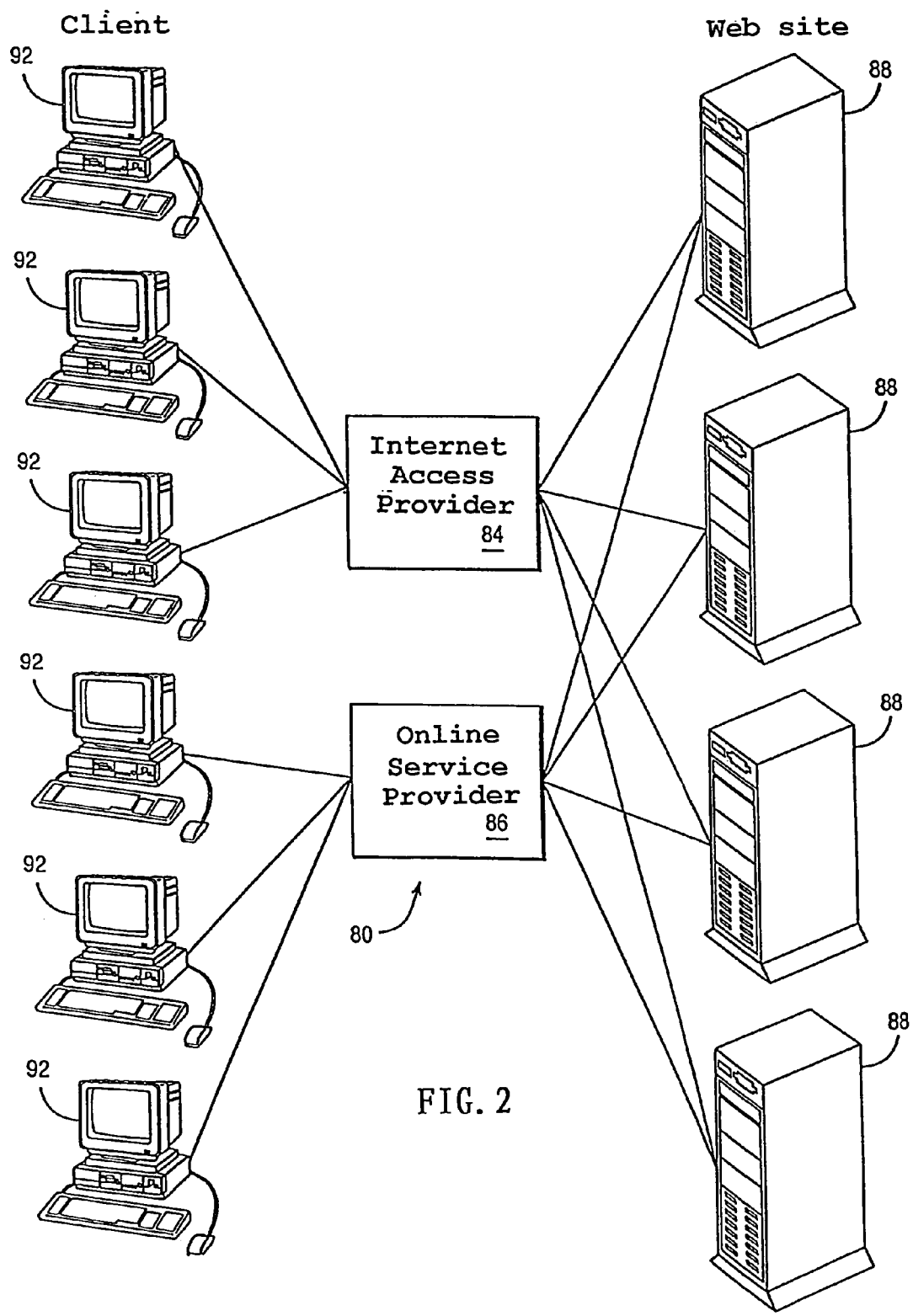
FIG. 2 is the computer network according to the preferred embodiment of this invention.

FIG. 2 illustrates the computer network 80 following client/server architecture. Internet is a well-known computer network following the architecture. However, those skilled in the art should understand that the computer network 80 can be implemented not only by Internet but also by other distributed computer network such as Intranet.

Theoretically, Internet is a big network consisting of server 88 which can be accessed by a client, typically a personal computer, through some Internet service provider 84, such as Internet America, or online service provider, such as America Online, Prodigy, CompuServe, etc. Each client can run a browser (a client) to access server 88 through access providers. Every web server 88 is a web site. In this invention, web site may be a site providing directory service, or a search engine, or a system coupled with server executing the method of this invention and multiple search engines to provide native language query service for Internet users.

Since this invention relates to the network transmission, it is helpful to have an understanding of network and its operating principle. There are not details of the network to which this invention can be applied. For example, this invention can be applied to a global network such as Internet.

Figure 3:
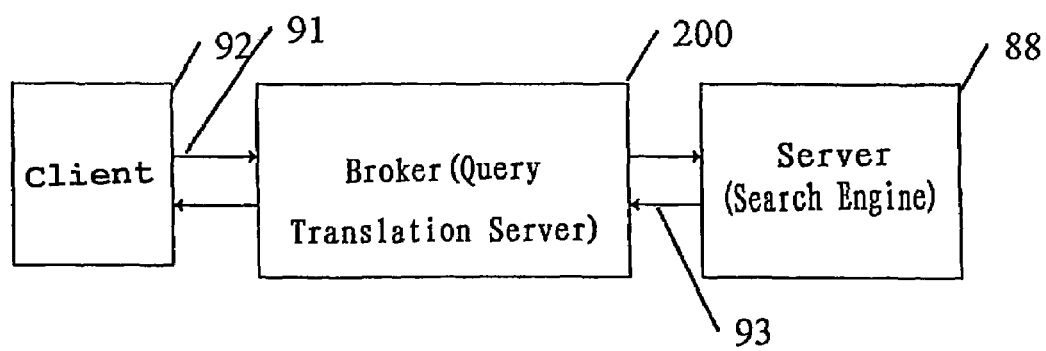
FIG. 3 is the client/broker/server architecture according to the preferred embodiment of this invention.

Based on the client/server architecture illustrated in FIG. 1, this invention adopts a client/broker/server architecture for Internet illustrated in FIG. 3. Actually, the above client/server architecture exists between client 92 and broker 200 as well as between broker 200 and server 88. In FIG. 3, client 92 first sends request 91 to broker 200. Broker 200 processes the request 91 and sends the processed request to server 88. Server 88 provides corresponding service per the request and return response 93 to broker 200. Broker 200 processes response 93 and returns the processed response to client 92.

The site executing the method of this invention acts as broker 200. Client 92 may be any existing browser, server 88 may be any existing site, which provides search engines.

Currently, every search engine uses a dedicated language. One search engine can accept only query terms in that dedicated language. For example, Yahoo! can accept query terms in English, thus its dedicated language is English. Another example is Sina (www.sina.com.cn) whose dedicated language is Chinese. The native language of user may be any language that is the same as or different from the dedicated language of the search engine.

Figure 4:
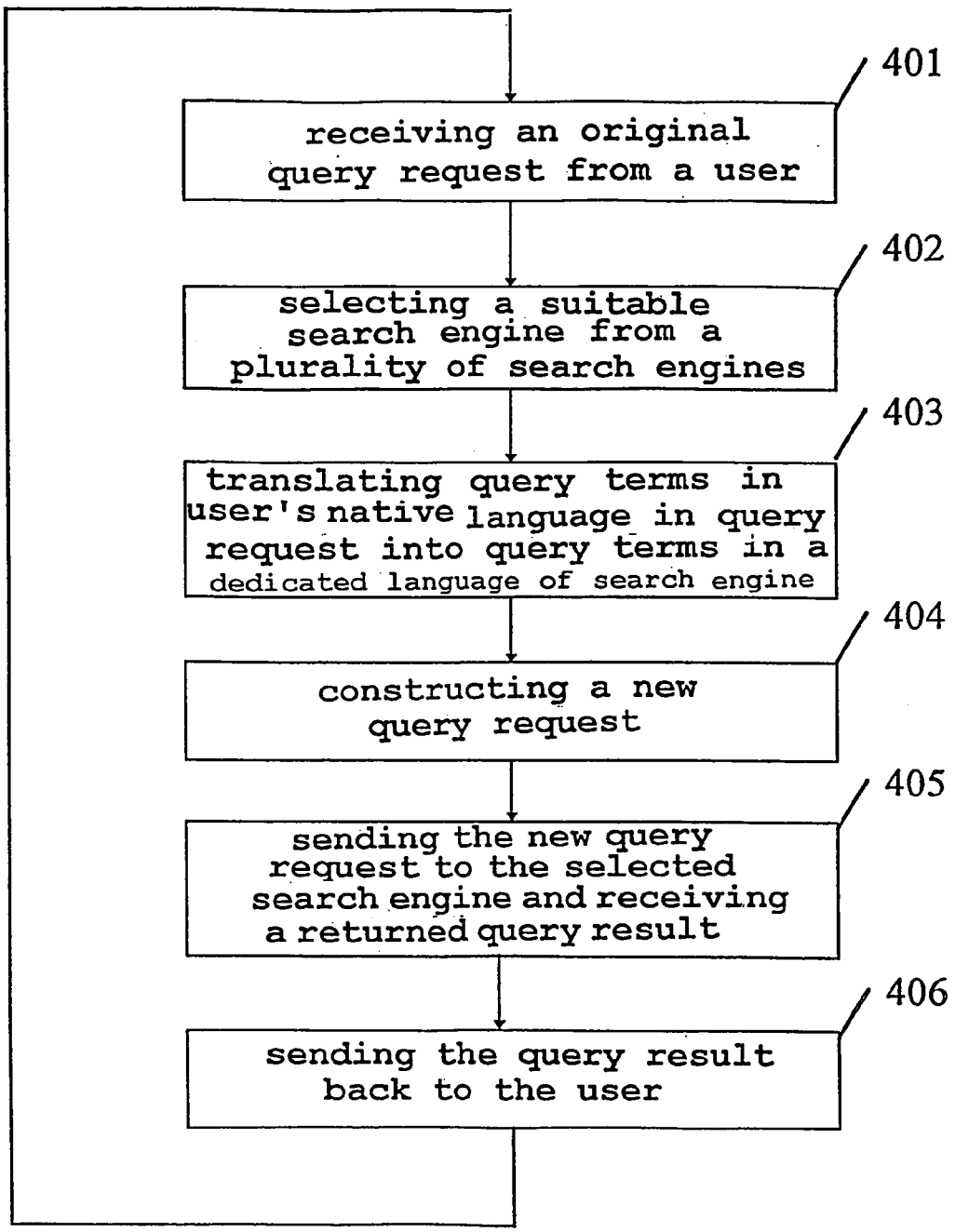
FIG. 4 is the flow chart of execution of the first embodiment of this invention that provides query service in native language for Internet users.

FIG. 4 is the flow chart of execution of the first embodiment of this invention that provides query service in native language for Internet users. The method utilizes existing multiple search engines on Internet, each one using dedicated language and accepting query request containing query terms in the dedicated language and returning query results relevant to the query terms.

At step 401, the original query request is accepted which contains the query term in the Internet user's native language. At step 402, a suitable search engine is selected from multiple search engines per the request. At step 403, the query term in native language is translated to the specific language used by the selected search engine. At step 404, a new query request is constructed according to the original query request and the specific language used by the identified search engine. At step 405, the new query request is sent to the selected search engine and query result is accepted. At step 406, the query result is returned to the user as a relevant query result of the original query request.

One may develop a program implementing the query translation method of FIG. 4 by using Java language so that it can run on various operating systems including the above AIX, Windows 95/98/NT, etc. As this program code can be made compatible with Servlet API Standard, it can be embedded into many Web sites and can run with other Web servers. Of course, it is also possible to configure a new site in the network shown in FIG. 2, dedicated for executing the method of providing query services in native language to Internet users, as shown in FIG. 4. In such cases, the newly configured site is called a query translation server.

The implementation of each steps of FIG. 4 is described in details below.

Step 401 in FIG. 4 may be implemented in many ways.

In a simple way, the query translation server runs as a proxy server. This requires that the user configures the web client software so that all the query requests sent by the client software are sent to query translation server of this invention. This approach brings inconvenience to user sometimes and increases the burden of the query translation server and computer network since files that need not be translated such as image and audio files have to go through it too.

Another way is that the query translation server runs as a normal server but uses an URL transformation scheme. The scheme automatically adds prefixes including the network address and path of the query translation server in front of the requested URL when the user sends a query request. Therefore, all the query requests of the client are automatically transferred to the query translation server of this invention.

Especially, if the unique URL transformation scheme mentioned below is used, no modification of the client software is needed, thus greatly facilitating the operation of the users. Another improvement lies in that in order to decrease the burden of the query translation server and computer network, different prefixes are placed in front of different URLs. This point is easy to see by analyzing the query request sent by the client. Query requests may be classified into 2 types. One type contains query terms and if the query terms use a kind of language different from the specific language used by the search engine, the query terms must be translated into ones in the specific language before they are sent to the search engine. Another type does not contain any query terms and it is not necessary to translate them, so the query translation server can redirect directly to the corresponding search engine. Thus these two types of query request should be treated differently. In this invention, different prefixes are added to the URLs of these two types of query request, i.e., translation prefix and redirect prefix, so that these query requests are treated differently in the query translation server of this invention.

Without any configuration change of the client software, the process of adding prefixes is done on the query translation server. The query translation server first gets the homepage of a search engine and adds appropriate prefixes to the URLs (i.e. the URL of the query translation servers) embedded in the homepage and returns the thus modified homepage to the client. In the following queries, similar URL transformation is applied to every web page returned by the search engine.

Steps 402 and 403 in FIG. 4 can be implemented by using predefined templates of this invention for search engines. The templates may be stored in the memory or disk of query translation server and retrieved in a file or database. The templates contain necessary information for the search engines supported by the query translation server, the information is used at step 402 and step 403.

For example, the following templates for search engines may be stored in a template file.
    yahoo=\
        url=http://search.yahoo.com/bin/search,\
        parameterName=p,\
        language=English,\
        assemblerClass=Generic,\
        dictionaryContext=
    ibm=\
        url=http://www.ibm.com:8080/db2search/,\
        parameterName=q:s,\
        language=English,\
        assemblerClass=Generic,\
        dictionaryContext=ibm
    . . .

In the example, the first two templates are for Yahoo! and IBM respectively. Every template defines the URL for the search program of the search engine, a list of parameters to be translated in the query command, the specific language acceptable by the search engine, the rule for combination of query terms, and the dictionary context of specific site. The rule for combination of query terms is used to specify the relationship between query terms, for example, query terms may be combined by "+", "−", "AND", "OR", or "NOT". The rules may be different for different search engines. The dictionary context of a specific site is used to name the specific dictionary when the query is done in a specific site.

It should be indicated that using templates is not the only way to support the method of this invention. Other ways may be used to store and retrieve the necessary information for Internet search engines. This is the common sense of developers in this domain and thus do not impose any restriction to this invention.

Suppose the original query request over Yahoo! site is received at step 401 which contains the following URL:
    http://search.yahoo.com/bin/search?p=_y=66

At step 402, a template of search engine is looked up that matches the URL. The following search engine template is found:
    yahoo=\
        url=http://search.yahoo.com/bin/search,\
        parameterName=p,\
        language=English,\
        assemblerClass=Generic,\
        dictionaryContext=

This is a template for Yahoo!'. Thus it is known that the user wants to query Yahoo! search engine. It is also known that parameter list in the URL is "p=_", since the template specifies that only parameter "p" needs to be translated. The specific language of the search engine is English. The combination rule for the search engine is named as Generic, which defines the rule of combination of query terms for Yahoo! search engine in the form of a function. The dictionary context is null, indicating that general dictionary should be used.

At step 403, the query term "p=_" in native language (Chinese here) of the parameter list is translated into query terms in specific language (English here). Using a particular Chinese term, for example, the English query term may be "recreation".

The following has to be noted. If there is no matched search engine template in the template file, a default rule is to be used for that URL. The default rule first checks which one is the dedicated language used by the search engine designated by that URL (corresponding to "language" parameter in the template) based on the language employed by the Web page (just that page from which the user sends out the request) embedded into that URL, or locates from the URL history record processed by the query translation server an URL most similar to that URL, and checks the language used by the returned Web page. The checked result is labelled as the dedicated language. Then the location of the query term parameter (corresponding to "parameter Name" parameter in the template) is found based on the parameter of the query parameter list expressed in the native language. After the determination of the location of the query term parameter, the query term parameter in the native language is translated into a query term in the dedicated language. The parameters corresponding to "assemblerClass" parameter and "dictionaryContext" parameter in the template take their default values.

At step 404, new query request for the selected search engine is made from the original query request and the query term in the specific language used by the search engine. In this example, new query request contains the following URL:

http://search.yahoo.com/bin/search?p=recreation&y=66

Step 405 may be executed directly on query translation server. However, the simple approach may result in loss of some proprietary features of this invention, such as providing multiple translation choices to users. A better alternative is to predefine some script program that will be executed on the client when it is downloaded at the client as part of the responsive web page. So the web page is made from the query request coming at step 404 and the predefined script, then it is returned to the client as a response. It is the characteristic of the script that it will be executed automatically when the response is received at the client.

Since the particular Chinese term referenced above may be translated into several English terms, such as "recreation", "game" or "play", steps 403 and 404 may generate several URL, such as:

http://search.yahoo.com/bin/search?p=recreation&y=66,
http://search.yahoo.com/bin/search?p=game&y=66, and
http://search.yahoo.com/bin/search?p=play&y=66.

One of them, for example http://search.yahoo.com/bin/search?p=recreation&y=66 is labeled as the default URL.

The multiple translation options produced during translation can be displayed to the user with the help of the written script program, and the default translated query request is sent to the search engine via the query translation server. The server adds a segment of script program to the Web page, which is then sent to the client. The script program itself provides a function such that when the client receives the web page, the script program embedded in the web page is automatically executed. This is well known to those skilled in the art and will no more be discussed.

Step 406 can also have many ways of implementation, which are similar to those at step 401. If step 401 is implemented by using an agent server, step 406 only simply returns the web page returned by the search engine to the client. If step 401 is implemented by using URL transformation, step 406 returns the web page to the client only after the above-mentioned URL transformation of the web page returned by the search engine.

Figure 5:
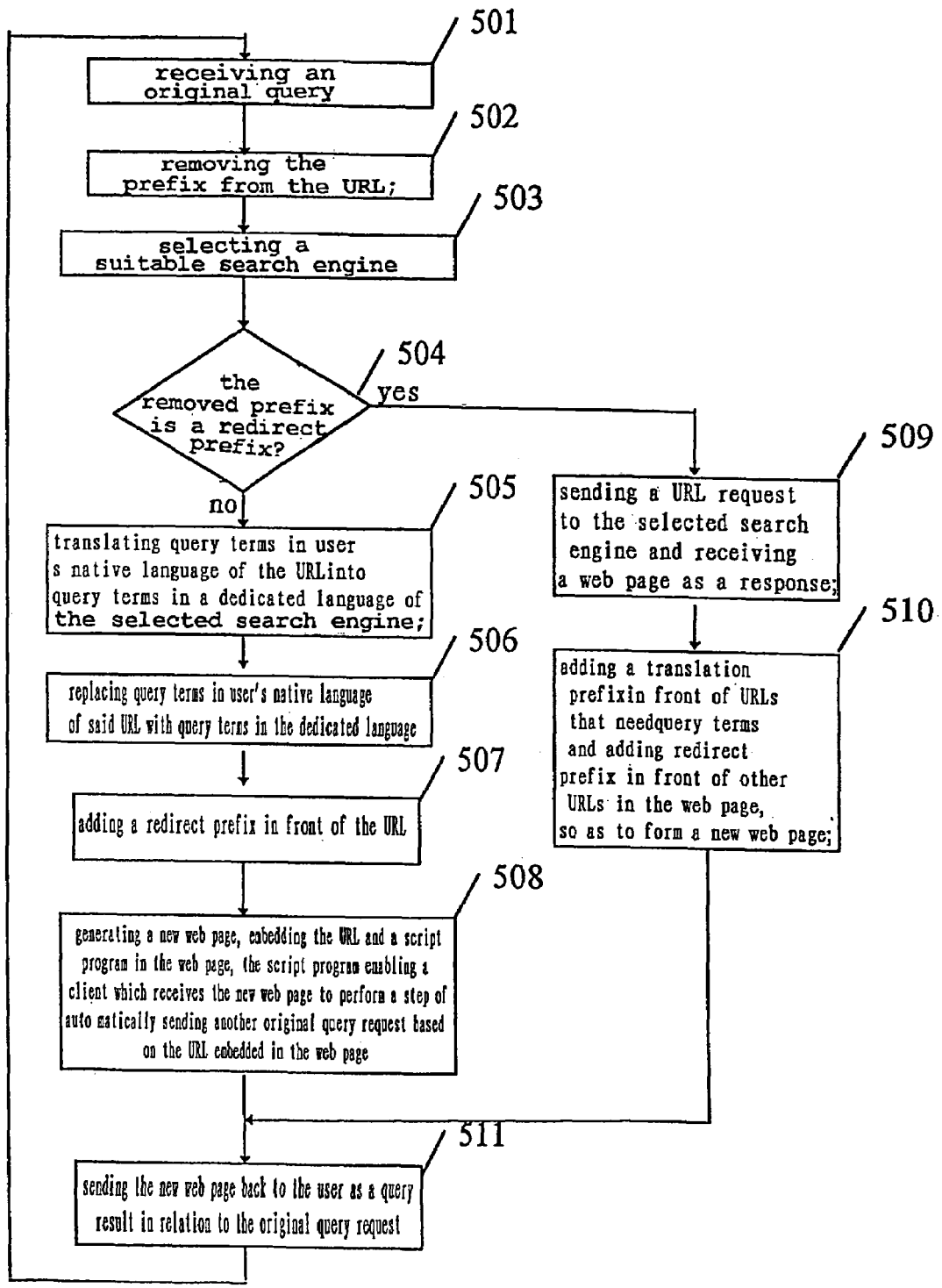
FIG. 5 is the flow chart of execution of the second embodiment of this invention that provides query service in native language for Internet users.

FIG. 5 is the flow diagram of the second embodiment of the method of this invention for providing query service in the native language to Internet users. The method employs multiple existing search engines, each of which has its own dedicated language for receiving the query requests of query terms in its respective dedicated language and for returning the query results related to the query term.

Step 501 receives the original query request of the user. Assume that the query translation method shown in FIG. 5 operates on one portal site, and the portal site of the URL is, for example, http://portal_site/. Then, in the client request received at step 501, the requested URL will certainly contain http://portal_site/.

Step 502 removes the prefix of the requested URL. As explained below, the prefix may be:

http://portal_site/redirect/(redirect prefix), or
http://portal_site/translate/(translation prefix).

Of course, these two prefixes do not impose any restrictions on this invention. In practice, there may be many kinds of prefixes, depending on various functions, so far as these prefixes conform to the dedicated syntax.

Step 503 selects a suitable search engine from a plurality of search engines.

Step 504 judges if the removed prefix is a redirection prefix http://portal_site/redirect/or not. If the judgment of the step 504 is "No", the processing proceeds to step 505; otherwise it proceeds to step 509. As in this example there are only two prefixes, namely redirection prefix and translation prefix. Hence in the steps before step 505 the removed prefix is certainly a translation prefix, i.e. http://portal_site/translate/.

If in the request received at step 501 the requested URL is:

http://portal_site/translation/http://search.yahoo.com/bin/search?p=_&y=66, the URL with prefix removed at step 505 will be
http://search.yahoo.com/bin/search?p=_&y=66

In step 505, the above query term of URL in the native language (in this example it is Chinese) is translated into a query term in the dedicated language (in this example it is English) in the similar way as steps 402 and 403 in FIG. 4 (i.e. by using search engine template). Then at step 506 the query term in the native language is replaced with those in the dedicated language.

As a particular term in Chinese may be translated into many English terms, such as "recreation", "game" or "play".

Step 506 can produce a plurality of URLs, e.g.

http://search.yahoo.com/bin/search?p=recreation&y=66,
http://search.yahoo.com/bin/search?p=game&y=66, and
http://search.yahoo.com/bin/search?p=play&y=66, One of the above three URLs, for example, http://search.yahoo.com/bin/search?p=recreation&y=66
is labelled as a default URL.

To support the combined query requests, the combination operators such as "+" "−", "AND", "OR", or "NOT" in the query request are identified by means of the combination rule specified by the template of the search engine. Then the query terms in the native language separated by the combination operators are translated into query terms in the dedicated language.

To support the site-specific search, an appropriate dictionary is selected by the dictionary context (dictionaryContext) of template for the search engine and translation is done using the dictionary. For example, if the user query is over IBM site, the query term ___}_ may be translated into and substituted with "RS/6000", "AS/400" or "S/390". If the user query is over HP site, the query term ___}_ may be translated into and substituted with "HP3000" or "NetServer", etc.

After step 506, at step 507, redirect prefix is added in front of the above URL. Thus, the following three URLs are formed:

http://portal_site/redirect/http://search.yahoo.com/bin/search?p=recreation&y=66,
http://portal_site/redirect/http://search.yahoo.com/bin/search?p=game&y=66, and
http://portal_site/redirect/http://search.yahoo.com/bin/search?p=play&y=66

Then the processing proceeds to step 508. At step 508, a new web page is generated in which the above three URLs and a segment of script are embedded. The script will be executed automatically by the client when the web page is received. By executing the script, the client displays multiple translation choices of the Chinese query term to the user. There are many ways to display the translation choices. A good way is to open a new window dynamically and show the translation choices in that window. Every translation choice has a hyper-link, that is, the URL contains the URL of translation. In the example, the Chinese query term has three translation choices in English: "recreation", "game" and "play". These translation choices are shown in the new window. The user can click on either of the three translations using pointing device and the browser then sends another original query request. Another function of the above script is to send a new request based on the default URL (http://portal_site/redirect/http://search.yahoo.com/bin/search?p=recreation&y=66).

A special segment of script can be embedded in the web page at step 508 to provide function with which a user can modify the template of search engine. For example, it may display the content of templates of search engine such as the four items described above. User may modify the content of templates and submit the modification to query translation server.

The processing proceeds to step 511 after step 508. At step 511, the newly generated web page is returned to client as a response. As described above, if the result of judgment at step 504 is "YES", then the process goes to step 509. At step 509, query translation server retrieves the web page identified by the URL from Internet.

For example, if the web page contains http://portal_site/redirect/http://search.yahoo.com/bin/search?p=recreation&y=66 is returned to client at step 511, then the client executes the script described above automatically and sends new HTTP request. After the processing at steps 501, 502, 503 and 504, the web page identified by following URL is retrieved at step 509:

http://search.yahoo.com/bin/search?p=recreation&y=66

This is the detail of the process. The request is sent to Yahoo! search engine. Yahoo! search engine searches for the query terms and returns the search results by web page. Then the process goes to step 510.

At step 510, the web page received from search engine is parsed and the embedded URL is transformed.

This is a simple introduction to hypertext markup language (HTML) used in web page formation. HTML uses tags or tag pair quoted in <> to control the display of web page content. Every HTML file must begin with <HTML> tag and ended with </HTML> tag. Other tags include: <A HREF> and <A> for anchor and title of link, <FRAME> and </FRAME> for frame content, <FRAME SRC> for introducing images into the frame, <FORM ACTION> for relating to a form. Tags can include other tags to become a nested one, thus creating enhanced objects. For example, <A HREF> tag may include an <IMG SRC> tag to create an linkable image. Of course, the above tags can only be regarded as examples since HTML is an evolving language.

At the above step 510, three types of URL in web page are transformed. They are, (1) _href_parameter of <A> or <AREA> tag
(2) _src_parameter of <FRAME> tag.
(3) _action_parameter of <FORM> tag.

Redirect prefix are added in front of type (1) and type (2) URLs http://portal_site/redirect/

Translate prefix are added before type (3) URL
http://portal_site/translate/

After transforming the URL embedded in the web page, a new web page is generated. Then the process goes to step 511. At step 511, the newly generated web page is returned to client as a response.

Figure 6:
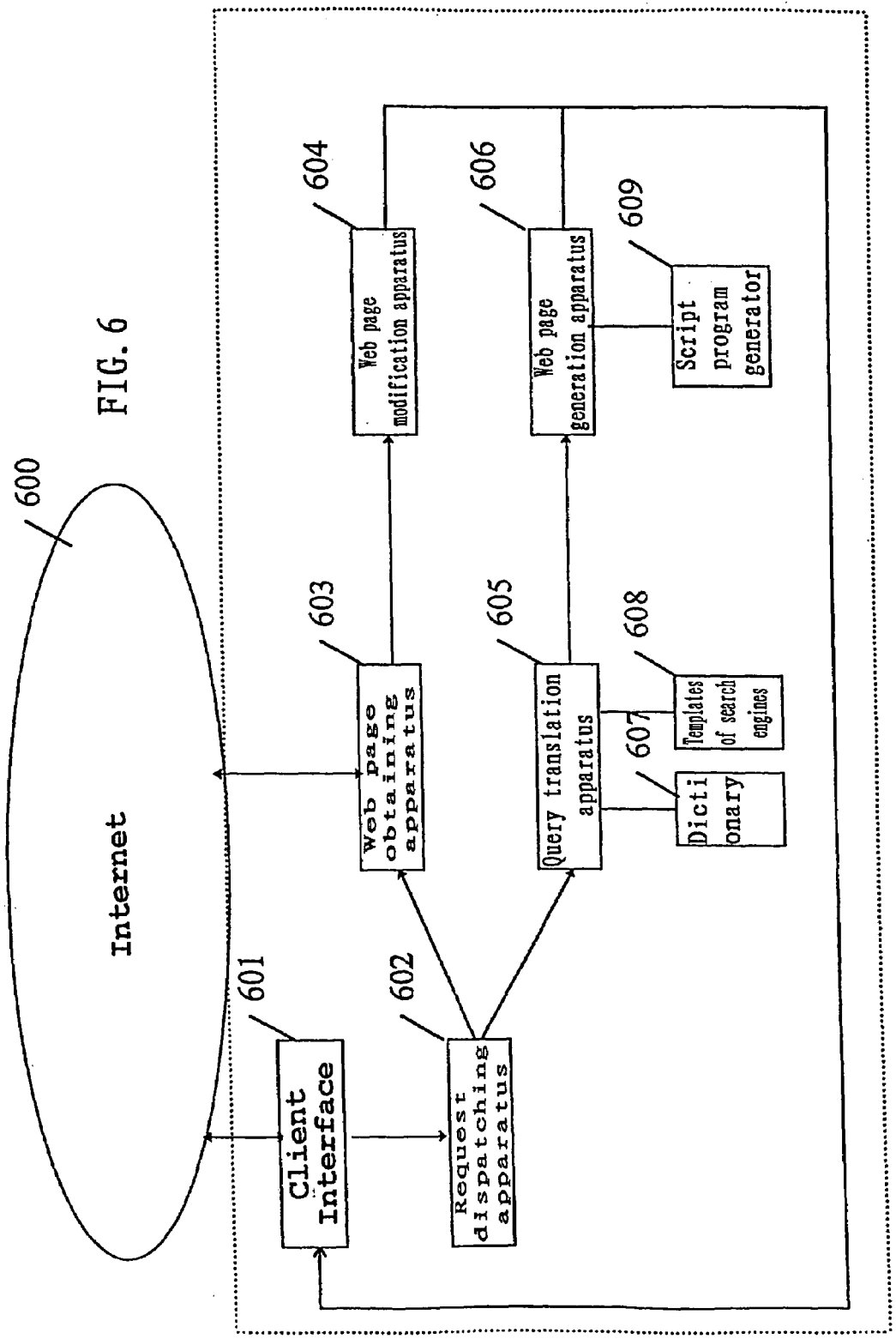
FIG. 6 is a schematic diagram illustrating a system of this invention that provides query service in native language for Internet users.

FIG. 6 illustrates the system of this invention that provides native language query service to Internet users. Included in the dotted frame is the query translation server of this invention which couples with search engines in Internet 600 to make up the system of this invention that provides native language query service to Internet users. As shown in FIG. 6, the query translation server of this invention consists of client interface 601 for receiving query request from client and returning query result to the client; request dispatching device 602 for checking the type of prefix of URL contained in the query request, for dispatching query requests containing URL prefixed by redirect prefix to web page retrieval device 603 and dispatching query requests containing URL prefixed by translation prefix to query translation device 605; web page obtaining device 603 for sending query request to the search engine specified by the URL and receiving the web page requested by the URL; web page modification device 604 for transforming the URLs embedded in the web page received by web page retrieval device 603, i.e. adding translation prefix in front of URL which requires query terms and adding redirect prefix in front of other URLs; query translation device 605 for translating/substituting the query terms in native language of requested URL into/with query terms in the specific language of search engine and adding redirect prefix to the URL; web page generation device for generating new web page and embedding URLs and a segment of script which will be executed automatically when client receives the web page and sends another query request. Furthermore, query translation device 605 also utilizes dictionary 607 and search engine template storage device 608. Dictionary 607 stores abundant dictionary entries, each of them containing a mapping from native language terms to corresponding translations. Search engine template storage device 608 may be referred to as shown in FIGS. 4 and 5. Web page generation device 606 utilzes a script generator 609 for generating the script executed on the client.

FIGS. 7 to 10 are the demonstration with browser when user query is in Chinese using the method and system of this invention.

Figure 7:
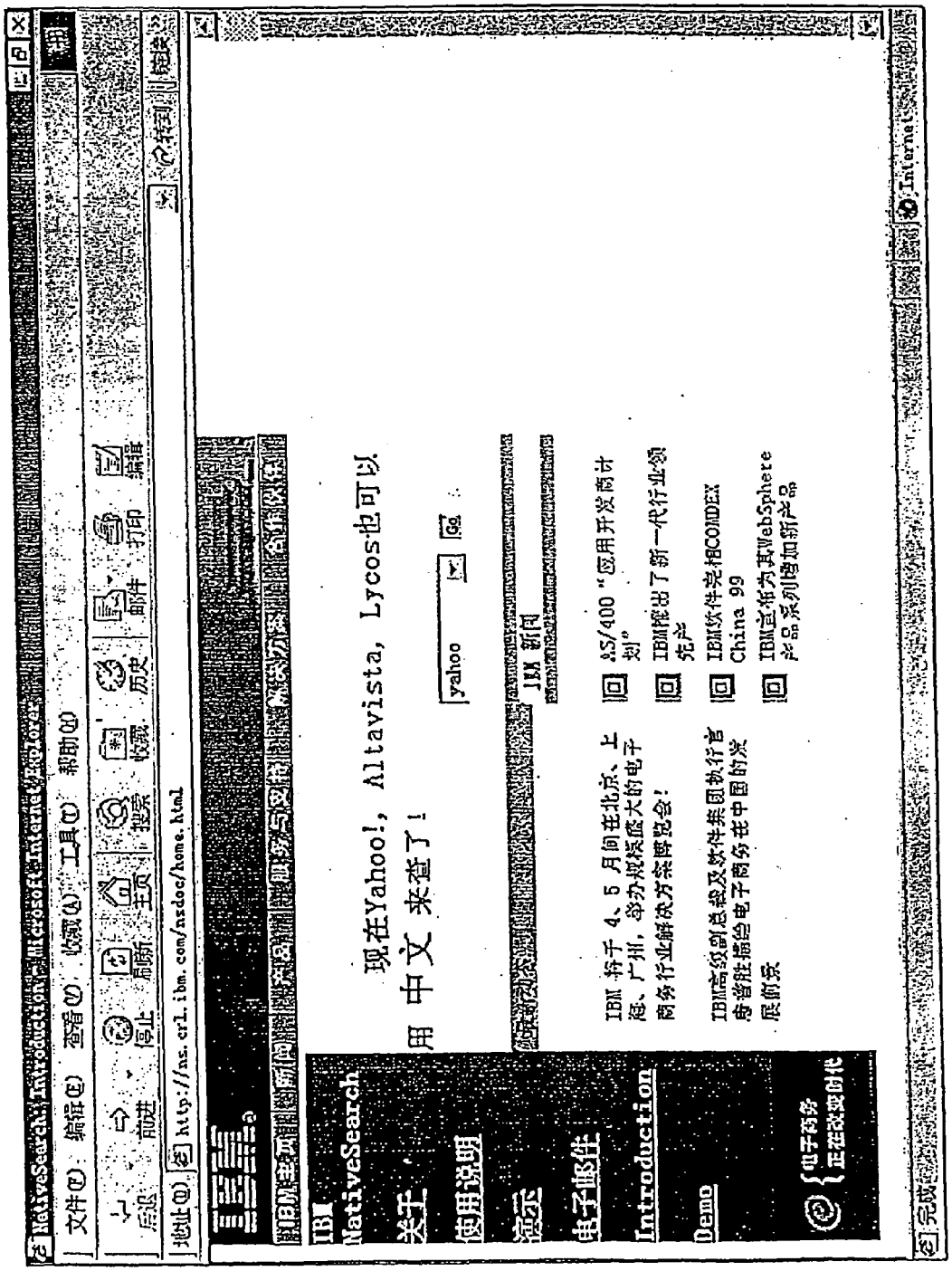
FIGS. 7 to 10 are the demonstrations of a browser when a user queries in Chinese using the method and system of this invention.

FIG. 7 shows that user can enter into Yahoo! search engine through another portal site for the query translation server. Of course, it is possible to add prefix of query translation server before Yahoo! URL with other approach instead of using such a portal site.

Figure 8:
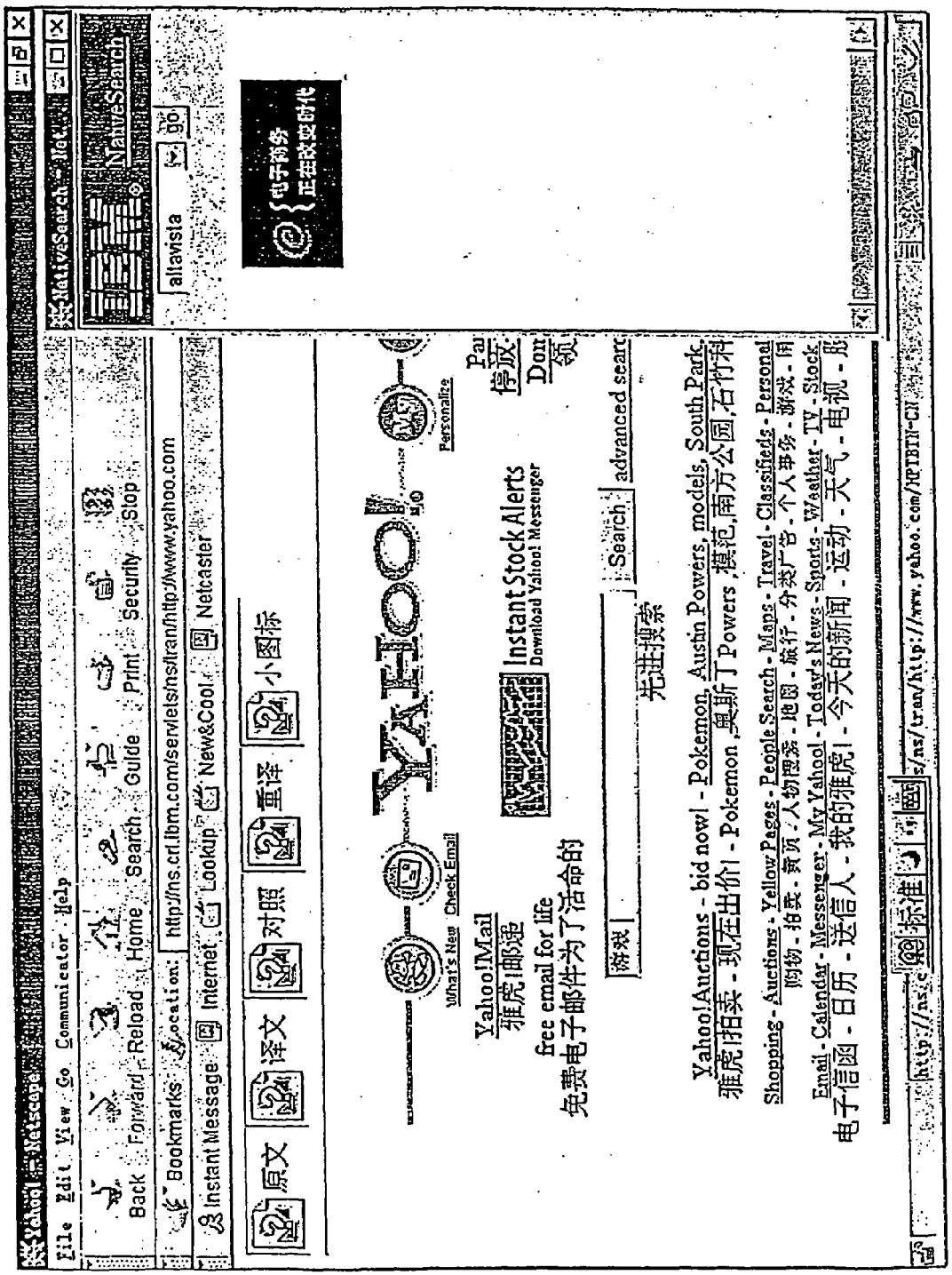

FIG. 8 shows that user inputs a Chinese query term in the homepage of Yahoo! search engine.

Figure 9:
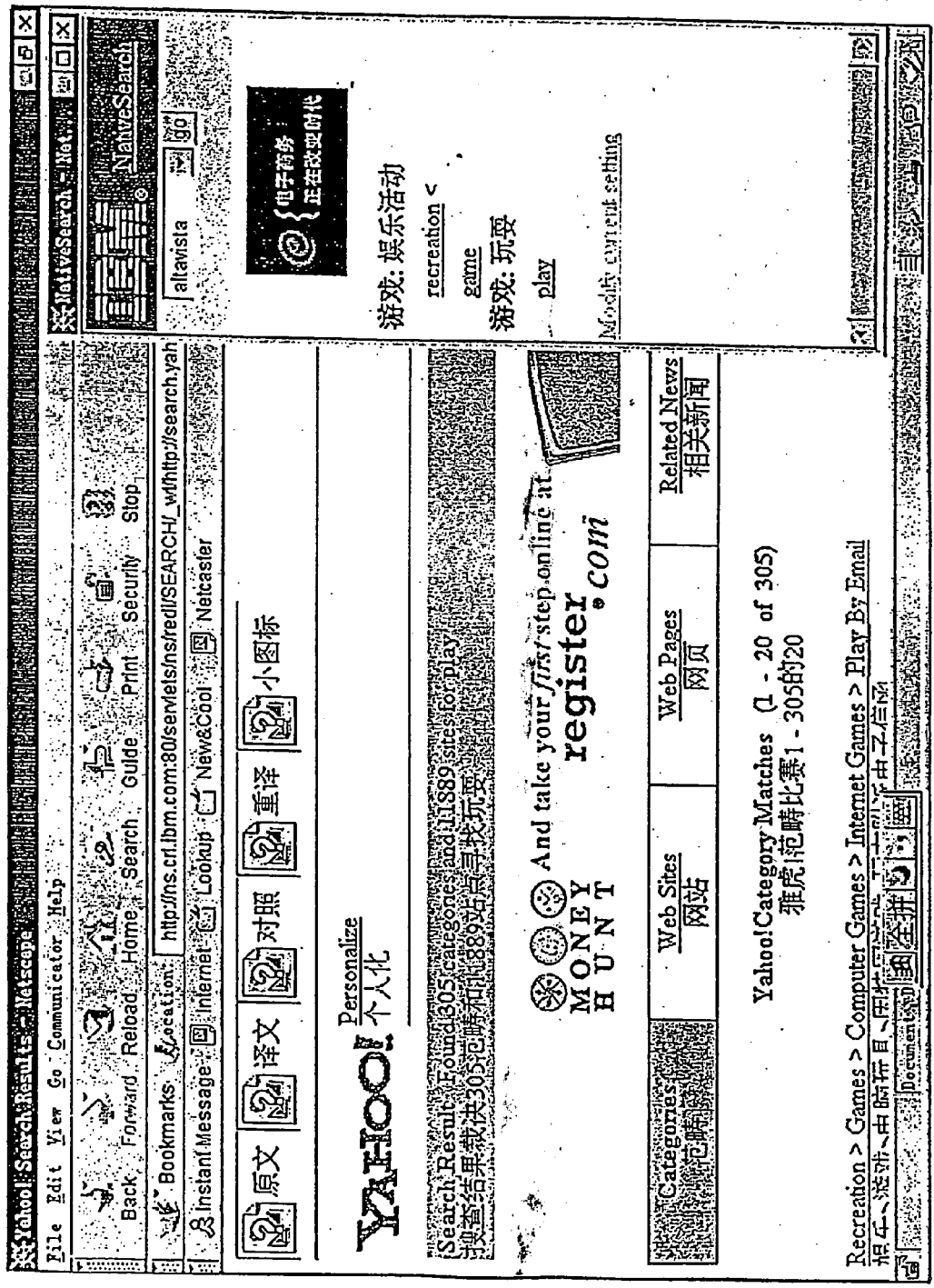

FIG. 9 shows the web page returned by Yahoo!, i.e., the query result, as a response of query request for the Chinese query term in FIG. 8 by means of the query translation server of this invention. Browser executes the script and the execution results in another window showing the three English translation choices for the Chinese query term. At the same time, user can click on the hypertext entitled "Modify Current Setting" so as to modify the template for Yahoo! search engine.

Figure 10:
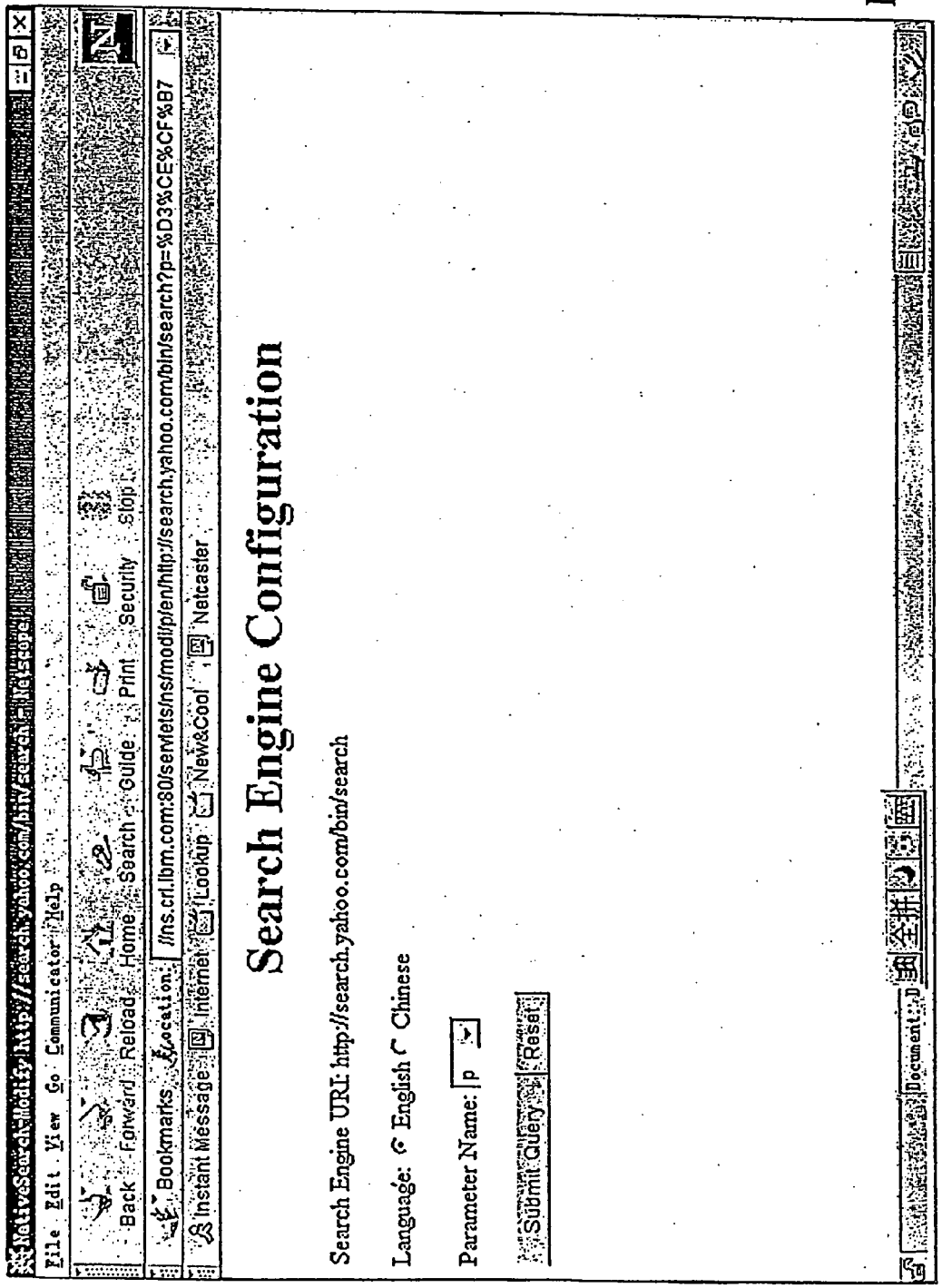

FIG. 10 shows the browser window after user clicks on the hypertext entitled "Modify Current Setting". It shows the content of template for Yahoo! search engine used by query translation server. User can make appropriate changes.

By combining the method of this invention with a web page translation service, it is possible to provide complete query translation service. The application is shown in FIG.

8 and FIG. 9, that is, user inputs Chinese query terms and receives Chinese query results. On top of that, this invention may also be integrated with speech recognition system to provide service that translates speech query terms into appropriate text query terms.

Though the above description about the method and system of this invention is in the context of Internet search engine, the design of this invention can by applied to retrieval or query of databases. With the design, a system can be constructed for providing native language query service for users of databases, comprising a plurality of databases, each database having a respective dedicated language, adapted for receiving query requests containing query terms in said dedicated language and returning query results in relation to said query terms, said system characterized by further comprising a query translation server which comprises: a client interface for receiving query requests sent by clients and returning query results to said clients; a query translation apparatus for receiving query terms in user's native language in the query requests received by said client interface into and relating them with query terms in the dedicated language of the database; a query result obtaining apparatus for sending the translated query requests to the databases designated by said query requests and obtaining query results. Similarly, said query terms in native language in query request to the database can be substituted with speech query terms.

Although certain preferred embodiments of this invention have been described in details with reference to the accompanying drawings, those skilled in the art should appreciate that various changes and modifications may be made therein without departing from the spirit and scope of this invention.

What is claimed is:

1. A computer implemented method for providing native language query service for Internet users, said method comprising the steps of:
   (a) receiving an original query request from an Internet user, said original query request containing query words of native language of said user;
   (b) selecting a suitable search engine from a plurality of search engines, each of said search engines having a respective dedicated language and a URL;
   (c) on the basis of said URL, retrieving a search engine template matching said URL from a search engine template storage;
   translating said query words of native language into said query words of a dedicated language defined in said retrieved search engine template;
   searching a dedicated language corresponding to said URL from history records based on said URL in the event no search engine template matching said URL is retrieved from said search engine template storage;
   determining positions of said query word parameters by using linguistic characteristics of parameter values; and
   translating said query words of native language at said positions into said query words of said dedicated language;
   (d) constructing a new query request directed to said selected search engine based on said original query request and said query words of dedicated language;
   (e) sending said new query request to said selected search engine and receiving a returned query result;
   (f) sending said query result back to said user as a query result in relation to said original query request.

2. The method according to claim 1, wherein step (b) comprises the step of selecting said search engines from said plurality of designated URLs in said original query request as the selected search engine.

3. The method according to claim 1, wherein step (d) comprises the step of replacing said query words of native language in said original query request with said query words of said dedicated language so as to form said new query request.

4. The method according to claim 1, wherein step (d) comprises the step of replacing said query words of native language in said original query request with said query words of said dedicated language so as to form said new query request.

5. A computer implemented method for providing native language query service for Internet users, said method comprising steps of:
   (a) receiving at a site an original query request from an Internet user, said original query request containing a URL requested by said Internet user, said URL having a prefix for designating a site;
   (b) removing said prefix from said URL;
   (c) selecting a suitable search engine from a plurality of search engines, each of said search engines having a respective dedicated language;
   (d) performing the following steps in the event said removed prefix is a redirect prefix;
      (d1) sending a request containing said URL to said selected search engine and receiving a web page as a response;
      (d2) adding a translation prefix before URLs that need said query words and a redirect prefix before other URLs in said web page, so as to form a new web page;
   (e) performing the following steps in the event said removed prefix is a translation prefix;
      (e1) translating said query words of user's native language in parameters of said URL into said query words of a dedicated language of said selected search engine;
      (e2) replacing said query words of user's native language in parameters of said URL with said query words of said dedicated language;
      (e3) adding said redirect prefix before said URL;
      (e4) generating a new web page, embedding said URL and a Script program in said web page, said Script program enabling a client which receives said new web page to perform a step of automatically sending another original query request based on said URL embedded in said web page;
   (f) sending said new web page back to said user as a query result in relation to said original query request.

6. The method according to claim 5, wherein step (c) comprises the step of selecting said search engine designated by said URL as said selected search engine.

7. The method according to claim 6, wherein step (e1) comprises the steps of:
   on the basis of said URL, retrieving said search engine template and matching said URL from a search engine template storage;
   translating said query words from native language into said query words of a dedicated language defined in said retrieved search engine.

8. The method according to claim 7, wherein said step (e1) further comprises the steps of:
   searching a dedicated language corresponding to said URL from history records in said site based on said URL; in the event none of said search engine templates match said URL as retrieved from said search engine template storage;

determining positions of said query word parameters by using linguistic characteristics of parameter values;

translating said query words of said native language at said positions into said query words of said dedicated language.

9. The method according to claim 5, wherein step (e) is
(e) performing following steps in the event said removed prefix is said translation prefix;
  (e1) translating said query word of said user's native language in parameters of said URL into a plurality of said query words of said dedicated language of said selected search engine;
  (e2) replacing said query word of user's native language in parameters of said URL with each of said plurality of query words of said dedicated language respectively and forming a plurality of URLs;
  (e3) adding a redirect prefix before each of said plurality of URLs;
  (e4) setting one of said plurality of URLs as a default URL;
  (e5) generating a new web page, embedding said plurality of said URLs and a Script program in said web page, said Script program enabling said client which receives said new web page to perform steps of: displaying said plurality of query words of said dedicated language in hyper text format, and automatically sending another original query request based on said default URL embedded in said web page.

10. A computer implemented system for providing native language query service for Internet users, said system utilizes a query translation server which comprises:
  a client interface, for receiving query requests sent by clients and returning query results to said clients;
  a request distribution apparatus, for receiving said query requests from said client interface, removing prefixes from requested URLs, and distributing said query requests to different components;
  a web page retrieving apparatus, for receiving said query request whose prefix is a redirect prefix from said request distribution apparatus, sending said query request to a search engine having a dedicated language designated by a URL and obtaining a requested web page;
  a web page modification apparatus, for forming a new web page by adding translation prefixes before URLs that need query words and adding redirect prefixes before other URLs in the obtained web page, and sending said new web page to said client interface;
  a query translation apparatus, for receiving said query request whose prefix is a translation prefix from said request distribution apparatus, translating query words of user's native language in the requested URL into and replacing them with query words of a dedicated language of said search engine, and adding a redirect prefix before said URL;
  a web page generation apparatus, for generating a new web page, embedding said URL and a Script program in said web page, and sending said new web page to said client interface, said Script program enabling a client which receives said new web page to perform a step of automatically sending another query request based on said URL embedded in said web page.

11. The system according to claim 10, wherein said query words of native language are speech query words.

12. A computer implemented system for providing native language query service for database users, said system utilizes a query translation server which comprises:
  a client interface, for receiving query requests sent by clients and returning query results to said clients;
  a query translation apparatus, for on the basis of a URL, retrieving a search engine template matching said URL from a search engine template storage;
  translating said query words of native language into said query words of a dedicated language defined in said retrieved search engine template;
  searching a dedicated language corresponding to said URL from history records based on said URL in the event no search engine template matching said URL is retrieved from said search engine template storage;
  determining positions of said query word parameters by using linguistic characteristics of parameter values; and
  translating said query words of native language at said positions into said query words of said dedicated language;
  a query result obtaining apparatus, for sending the translated said query requests to a database having said dedicated language designated by said query requests and obtaining said query results.

13. The system according to claim 12, wherein said query words of native language are speech query words.

14. A program storage device readable by machine, tangibly embodying a program of instructions executable by the machine to perform method steps for providing native language query service for Internet users, said method comprising the steps of:
  (a) receiving an original query request from an Internet user, said original query request containing said query words of native language of said user;
  (b) selecting a suitable search engine from a plurality of search engines, each of said search engines having a respective dedicated language;
  (c) on the basis of said URL, retrieving a search engine template matching said URL from a search engine template storage;
  translating said query words of native language into said query words of a dedicated language defined in said retrieved search engine template;
  searching a dedicated language corresponding to said URL from history records based on said URL in the event no search engine template matching said URL is retrieved from said search engine template storage;
  determining positions of said query word parameters by using linguistic characteristics of parameter values; and
  translating said query words of native language at said positions into said query words of said dedicated language;
  (d) constructing a new query request directed to said selected search engine based on said original query request and said query words of dedicated language;
  (e) sending said new query request to said selected search engine and receiving a returned query result;
  (f) sending said query result back to said user as a query result in relation to said original query request.

15. The method according to claim 1, wherein said search engine template is comprised of:
  definitions of the URL for the search program of the search engine;
  lists of parameters to be translated in the query command;
  specific languages acceptable by the search engine;
  rules for combination of query terms; and
  dictionary contexts of specific site.

* * * * *